United States Patent
Kreidler et al.

(10) Patent No.: US 10,402,881 B2
(45) Date of Patent: Sep. 3, 2019

(54) METHODS AND SYSTEMS FOR IDENTIFYING A REPLACEMENT MOTOR

(71) Applicant: Regal Beloit America, Inc., Beloit, WI (US)

(72) Inventors: Jason Jon Kreidler, Sheboygan Falls, WI (US); Stephen Paul Varano, West Bend, WI (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 14/189,449

(22) Filed: Feb. 25, 2014

(65) Prior Publication Data

US 2015/0242923 A1    Aug. 27, 2015

(51) Int. Cl.
*G06Q 30/06* (2012.01)

(52) U.S. Cl.
CPC ..... *G06Q 30/0623* (2013.01); *G06Q 30/0629* (2013.01); *G06Q 30/0631* (2013.01)

(58) Field of Classification Search
CPC . G06Q 30/00; G06Q 30/0623; G06Q 30/0641
See application file for complete search history.

(56) References Cited

U.S. PATENT DOCUMENTS

| | | | |
|---|---|---|---|
| 5,943,245 A * | 8/1999 | Melfi | G06F 17/50 700/32 |
| 6,568,596 B1 | 5/2003 | Shaw | |
| 6,985,877 B1 * | 1/2006 | Hayward | G06Q 10/06395 399/12 |
| 8,229,624 B2 * | 7/2012 | Breed | B60R 21/0132 701/36 |
| 8,245,930 B2 | 8/2012 | Bellows et al. | |
| 8,267,318 B2 | 9/2012 | Yoo | |
| 8,282,002 B2 | 10/2012 | Shams | |
| 8,292,184 B2 | 10/2012 | Turbovich | |
| 8,313,030 B2 | 11/2012 | Zolotov | |
| 8,510,138 B2 | 8/2013 | Marti et al. | |
| 8,556,179 B2 | 10/2013 | Gillet et al. | |
| 8,596,541 B2 | 12/2013 | Chiu et al. | |
| 2002/0087419 A1 * | 7/2002 | Andersson et al. | 705/26 |
| 2004/0199545 A1 * | 10/2004 | Wagner | B07C 7/005 |
| 2005/0055281 A1 * | 3/2005 | Williams | G06Q 10/00 235/383 |
| 2005/0143956 A1 * | 6/2005 | Long | G05B 19/4065 702/184 |

(Continued)

OTHER PUBLICATIONS

Dumitru, Horatiu, et al. "On-demand feature recommendations derived from mining public product descriptions." Proceedings of the 33rd International Conference on Software Engineering. ACM, 2011. (Year: 2011).*

*Primary Examiner* — Marissa Thein
*Assistant Examiner* — Michelle T Kringen
(74) *Attorney, Agent, or Firm* — Armstrong Teasdale LLP

(57) ABSTRACT

A client computing device comprising an indicia sensor and a processor coupled to the indicia sensor is described. The processor is configured to receive identification data for an original motor through the indicia sensor, identify a replacement motor based at least in part on the identification data, and identify a local seller of the replacement motor based at least in part on a first location associated with the client computing device and a second location associated with the local seller.

16 Claims, 5 Drawing Sheets

(56) References Cited

U.S. PATENT DOCUMENTS

| | | | | |
|---|---|---|---|---|
| 2005/0160014 A1* | 7/2005 | Moss | .................... | G06Q 30/00 |
| | | | | 705/26.61 |
| 2007/0063029 A1* | 3/2007 | Brandt | ................... | G06Q 10/08 |
| | | | | 235/385 |
| 2010/0060219 A1* | 3/2010 | Schock | ................... | F04D 25/06 |
| | | | | 318/400.21 |
| 2011/0276394 A1* | 11/2011 | Chan | ................. | G06F 17/30876 |
| | | | | 705/14.49 |
| 2013/0256405 A1 | 10/2013 | Montout | | |
| 2013/0324148 A1* | 12/2013 | Geib | ...................... | H04W 4/02 |
| | | | | 455/456.1 |
| 2014/0012748 A1* | 1/2014 | Knapp | .................. | G06Q 10/20 |
| | | | | 705/40 |
| 2014/0074865 A1* | 3/2014 | Zobrist | ................. | G06Q 10/06 |
| | | | | 707/749 |
| 2014/0139166 A1* | 5/2014 | Durfee | ..................... | G06F 8/60 |
| | | | | 318/494 |
| 2014/0250166 A1* | 9/2014 | Desai | ..................... | H04L 67/16 |
| | | | | 709/203 |

\* cited by examiner

METHODS AND SYSTEMS FOR IDENTIFYING A REPLACEMENT MOTOR

BACKGROUND OF THE DISCLOSURE

The field of the invention relates generally to motors, and more specifically, to methods and systems for identifying a replacement motor for an existing motor.

Typically, when a user of a motor seeks to replace the motor, the user must take a series of steps to identify a suitable replacement motor and identify a seller of the replacement motor. For example, the user may obtain a model number or other identification data included on a nameplate of the existing motor, determine specifications of the existing motor, and research technical specifications of other motors to determine which may be suitable replacements for the existing motor. Additionally, the user must identify sellers of motors and inquire as to whether any of the sellers sell any of the motors that the user identified as being suitable replacements. Performing such steps may be time consuming and labor intensive. While some known software applications alleviate some of these issues, they still require the user to manually enter identification data for the motor to be replaced and they do not automatically locate a local seller of a suitable replacement motor.

BRIEF DESCRIPTION OF THE DISCLOSURE

In one aspect, a client computing device comprising an indicia sensor and a processor coupled to the indicia sensor is provided. The processor is configured to receive identification data for an original motor through the indicia sensor, identify a replacement motor based at least in part on the identification data, and identify a local seller of the replacement motor based at least in part on a first location associated with the client computing device and a second location associated with the local seller.

In another aspect, a computer-implemented method for identifying a replacement motor is provided. The method is implemented using a client computing device that includes an indicia sensor. The method includes receiving, by the client computing device, identification data for an original motor through the indicia sensor. The method also includes identifying, by the client computing device, the replacement motor based at least in part on the identification data, and identifying, by the client computing device, a local seller of the replacement motor based at least in part on a first location associated with the client computing device and a second location associated with the local seller.

In yet another aspect, a computer-readable storage medium having computer-executable instructions embodied thereon is provided. When executed by a client computing device having at least one processor coupled to an indicia sensor, the computer-executable instructions cause the client computing device to receive identification data for an original motor through the indicia sensor, identify a replacement motor based at least in part on the identification data, and identify a local seller of the replacement motor based at least in part on a first location associated with the client computing device and a second location associated with the local seller.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION OF THE DISCLOSURE

Implementations of the systems and methods described herein enable a person to efficiently identify and order a replacement motor from a seller that is local to the person. More specifically, a client computing device obtains indicia from an original motor and identifies a corresponding replacement motor based at least in part on the indicia. Additionally, the client computing device identifies a local seller of the replacement motor, based at least in part on the location of the client computing device and the location of the local seller. In some implementations, the client computing device presents an option to contact the local seller or transmit an order for the replacement motor.

In one implementation, a computer program is provided, and the program is embodied on a computer-readable medium. In an example implementation, the computer program is executed on a single computing device, without requiring a connection to a server computer. The computer program is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Figure 1:
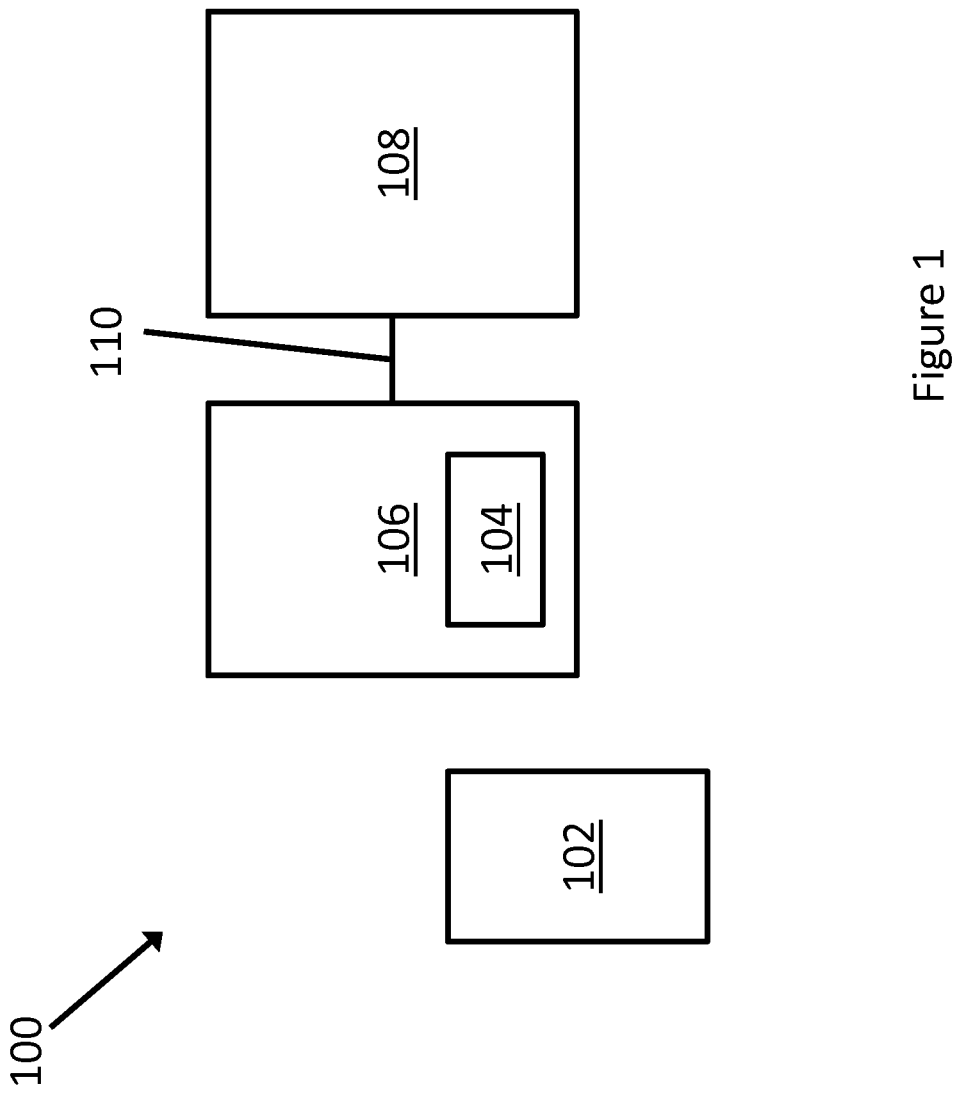
FIG. 1 is a block diagram of an example environment in which a client computing device may use indicia on a motor to identify a replacement motor.

FIG. 1 is a block diagram of an example environment 100 in which a client computing device 102 may use indicia 104 on a motor 106 to identify a replacement motor. In some implementations, motor 106 is an electric motor. Further, in some implementations, motor 106 is a variable speed motor, for example an electronically commutated motor (ECM). Motor 106 drives a load 108, such as a fan in a heating, ventilation, and air conditioning (HVAC) system, or an impeller in a pump. Motor 106 is coupled to load 108 by a shaft 110.

Indicia 104 includes identification data for identifying motor 106, for example, a model number, a serial number, a model name, a brand, and/or a date of manufacture. Indicia 104 may be associated with motor 106 by, for example, being printed or engraved directly on motor 106 or on a nameplate or tag affixed to or coupled to motor 106. In some implementations, indicia 104 is expressed in human-readable characters and/or numbers. In other implementations, indicia 104 appears as a barcode, a quick response code (QR code), or another non-human-readable code. In some implementations, indicia 104 is non-visual and may be detected instead through, for example, radio frequency identification. For example, in some implementations, indicia 104 may be a radio frequency identification (RFID) tag.

Figure 2:
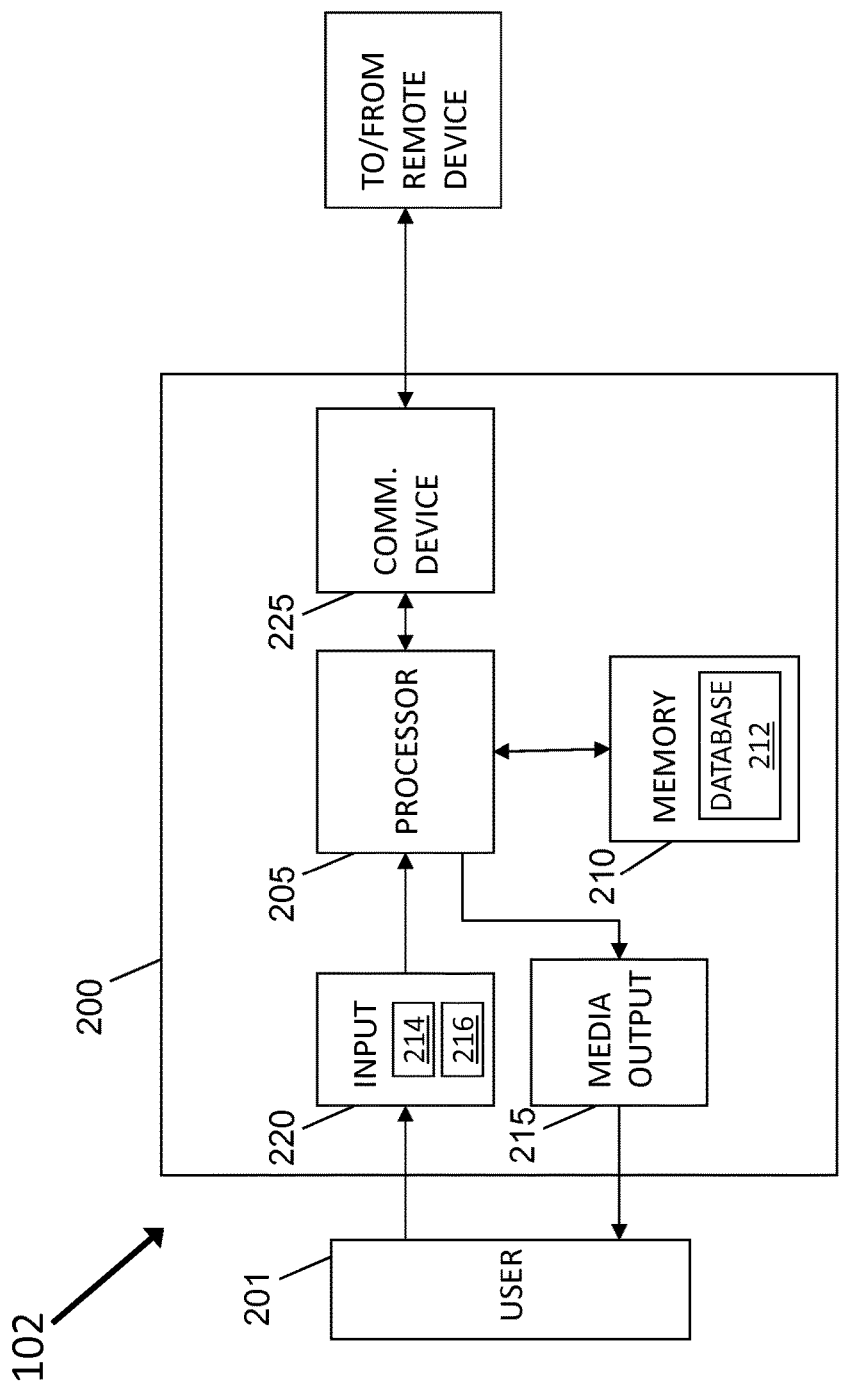
FIG. 2 is a block diagram of an example computing device.

Client computing device 102 is configured to obtain the identification data from indicia 104 through an indicia sensor 214 (FIG. 2). As described below, indicia sensor 214 may be an optical sensor, for example, a camera or a barcode scanner. In other implementations, indicia sensor 214 may be an RFID sensor. In implementations in which indicia sensor 214 is a camera, client computing device 102 obtains an image of indicia 104 and performs optical character recognition (OCR) on the image of indicia 104 to obtain the identification data (e.g., serial number). Using the identification data, client computing device 102 identifies a replacement motor (e.g., first replacement motor 306 or second replacement motor 316) (FIG. 3) and a local seller of the replacement motor (first seller 304 or second seller 314) (FIG. 3), as described in more detail below. Motor 106 is sometimes referred to herein as an original motor. In this disclosure, referring to motor 106 as an original motor means that motor 106 is to be replaced by a replacement motor (e.g., first replacement motor 306 or second replacement motor 316) (FIG. 3), and does not exclude the possibility that motor 106 replaced an earlier motor (not shown).

FIG. 2 is a block diagram of an example computing device 200. For example, client computing device 102 may be an implementation of computing device 200. Computing device 200 includes a processor 205 for executing instructions. In some implementations, executable instructions are stored in a memory area 210 to enable client computing device 102 to carry out processes described herein. Processor 205 may include one or more processing units (e.g., in a multi-core configuration). Memory area 210 is any device allowing information such as executable instructions and/or other data to be stored and retrieved. Memory area 210 may include a database 212 that stores identification data associated with motors of different brands, and correlates the motors according to their specifications. For example, motor 106 may be associated with a first brand, and a replacement motor, which has specifications that correspond with the specifications of motor 106, may be associated with a second brand. Additionally, database 212 may include data pertaining to sellers of motors and the locations of the sellers (e.g., addresses). In other implementations, database 212 may be separated into multiple databases (not shown) and may be remote to client computing device 102. Memory area 210 may include one or more computer-readable media.

In some implementations, computing device 200 also includes at least one media output component 215 for presenting information to user 201. Media output component 215 is any component capable of conveying information to user 201. In some implementations, media output component 215 includes an output adapter such as a video adapter and/or an audio adapter. An output adapter is operatively coupled to processor 205 and operatively couplable to an output device such as a display device (e.g., a liquid crystal display (LCD), one or more light emitting diodes (LED), an organic light emitting diode (OLED) display, cathode ray tube (CRT), or "electronic ink" display) or an audio output device (e.g., a speaker or headphones).

In some implementations, computing device 200 includes an input device 220 for receiving input from user 201. Input device 220 may include, for example, one or more buttons, a keypad, a touch sensitive panel (e.g., a touch pad or a touch screen), and/or a microphone. In at least some implementations, input device 220 includes an indicia sensor 214 and a global positioning system (GPS) component 216 that determines a location of computing device 200. A single component such as a touch screen may function as both an output device of media output component 215 and input device 220.

Figure 3:
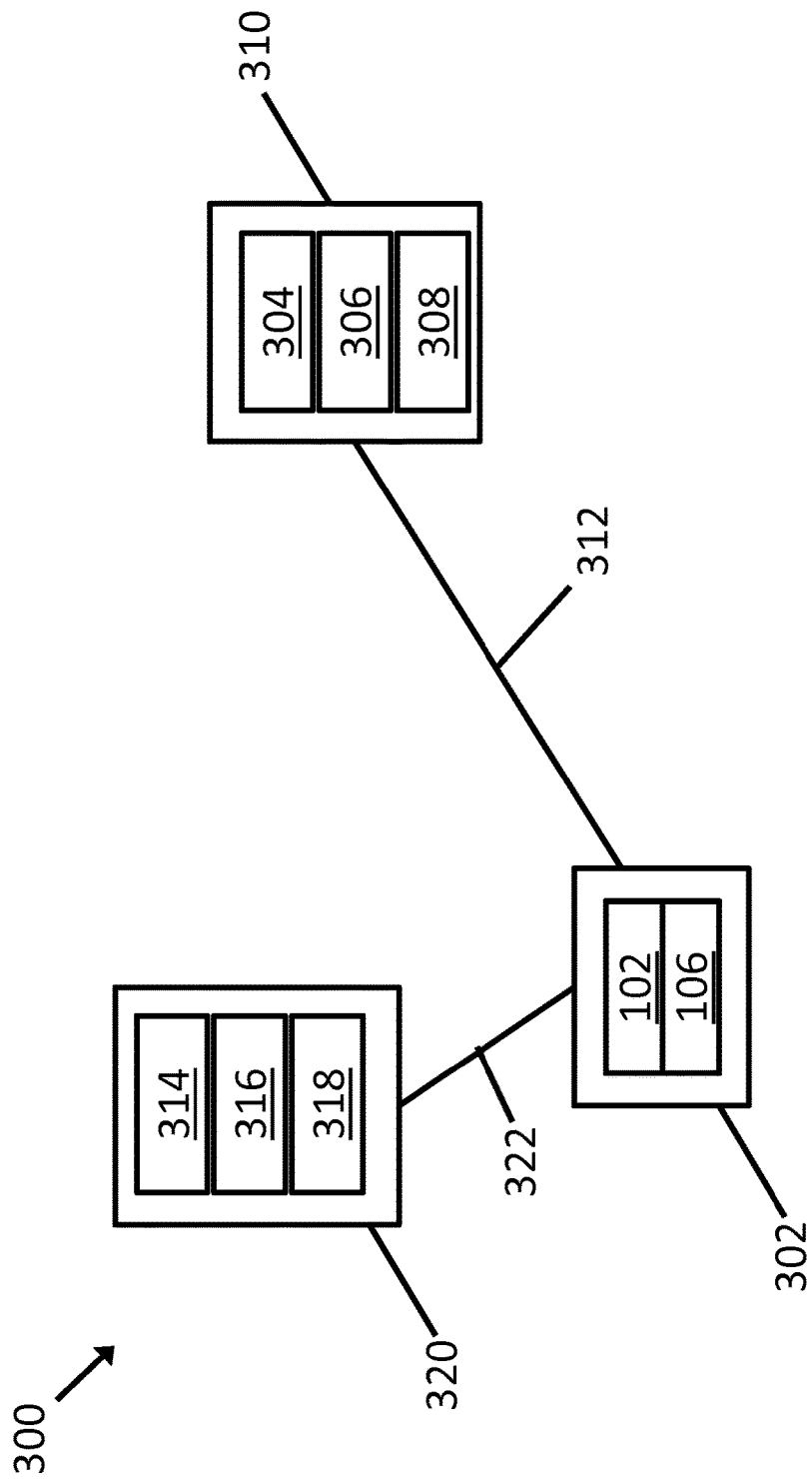
FIG. 3 is a block diagram of an environment including a first location associated with the client computing device of FIG. 1 relative to locations of sellers of replacement motors.

Computing device 200 may also include a communication device 225, which is communicatively couplable to a remote device, for example a computing device associated with local seller (e.g., first seller computing device 308 or second seller computing device 318) (FIG. 3). Communication device 225 may include, for example, a wired or wireless network adapter or a wireless data transceiver for use with a mobile phone network (e.g., Global System for Mobile communications (GSM), 3G, 4G), a short-range wireless network (e.g., Bluetooth) or other mobile data network (e.g., Worldwide Interoperability for Microwave Access (WI-MAX)).

FIG. 3 is a block diagram of an environment 300 that includes client computing device 102, a first seller 304 of a first replacement motor 306, and a second seller 314 of a second replacement motor 316. A first seller computing device 308 is associated with first seller 304 and a second seller computing device 318 is associated with second seller 314. Client computing device 102 and motor 106 are located at a first location 302. First seller 304 is located at a second location 310, which is a first distance 312 from first location 302. Second seller 314 is located at a third location 320 that is a second distance 322 from first location 302.

As described with reference to FIG. 1, client computing device 102 receives identification data for motor 106 through indicia sensor 214 and identifies at least one replacement motor (e.g., first replacement motor 306 and second replacement motor 316) based at least in part on the identification data. For example, client computing device 102 may query database 212 to identify at least one replacement motor that corresponds with the identification data of motor 106. In some implementations, database 212 includes technical specifications (e.g., torque, power, maximum speed, etc.) of motor 106 and technical specifications of possible replacement motors, and client computing device 102 determines which of the possible replacement motors have technical specifications that correspond with the technical specifications of motor 106. In other implementations, database 212 already includes an association between identification data for motor 106 and identification data for replacement motors (e.g., replacement motors 306 and 316) that have technical specifications that correspond with the technical specifications of motor 106.

Client computing device 102 also determines the location of client computing device (i.e., first location 302). For example, client computing device 102 may use GPS component 216 to determine first location 302. Additionally, client computing device 102 determines that first seller 304 and second seller 314 are within a predetermined range, for example 30 miles, of client computing device 102. For example, database 212 may include data pertaining to motors sold by a plurality of sellers and the locations of the sellers (e.g., addresses), and client computing device 102 may determine whether a distance (e.g., first distance 312 and second distance 322) is within the predetermined range (e.g., 30 miles) of client computing device 102. More specifically, client computing device 102 determines which of the sellers are local to client computing device 102. Client computing device 102 may further select one seller from first seller 304 and second seller 314 based, at least in part, on which of first distance 312 and second distance 322 is shorter. In some implementations, client computing device 102 may select one seller based on additional or alternative data, such as an availability of the replacement motor at the seller (e.g., whether the replacement motor is in stock or must be ordered) and/or a price of the replacement motor.

Additionally, client computing device 102 may select a replacement motor of a predetermined brand even if motor 106 is of a different brand. More specifically, motor 106 may be associated with a first brand, and client computing device 102 is configured to identify a replacement motor associated with a second brand and identify sellers of the replacement motor associated with the second brand. As an example, to facilitate this description, client computing device 102 selects second seller 314 and second replacement motor 316 at least because second distance 322 is shorter than first distance 312.

Figure 4:
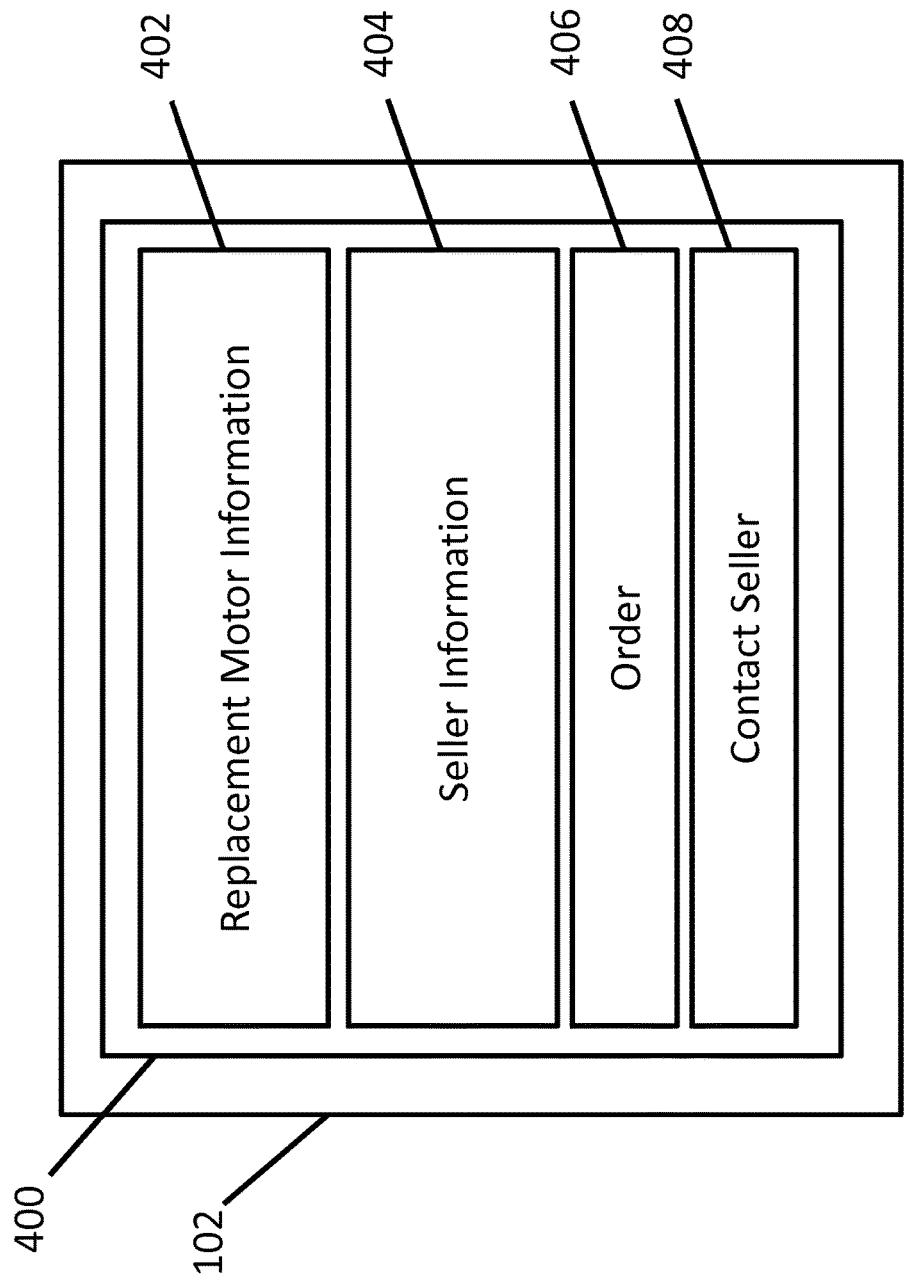
FIG. 4 is an example graphical interface that may be presented on the client computing device of FIG. 1.

FIG. 4 is an example graphical interface 400 that may be presented by client computing device 102. Continuing the description above, client computing device 102 may present graphical interface 400 to user 201 (FIG. 2) using media output component 215 (FIG. 2). Interface 400 displays information 402 regarding second replacement motor 316, and additional information 404 regarding second seller 314. For example, information 402 may include a name, a model number, a brand, and a price associated with second replacement motor 316. Information 404 may include, for example, a name, a location, a distance (e.g., second distance 322), and operating hours associated with second seller 314. Additionally, interface 400 displays an option 406 (e.g., a representation of a button) to order second replacement motor 316. Additionally, or alternatively, interface 400 may display an option 408 (e.g., a representation of a button) to contact second seller 314, for example by calling a phone number associated with second seller 314.

When client computing device 102 receives a selection of option 406 or a selection of option 408, client computing device 102 takes the corresponding action. More specifically, if client computing device 102 receives a selection of option 406 (i.e., client computing device detects, through input device 220, that option 406 has been selected), client computing device 102 transmits an order for second replacement motor 316 to second seller 314. More specifically, client computing device 102 transmits the order to second seller computing device 318. If client computing device receives a selection of option 408 (i.e., client computing device detects, through input device 220, that option 408 has been selected), client computing device 102 calls the phone number associated with second seller 314 so that user 201 may discuss second replacement motor 316 with second seller 314.

Figure 5:
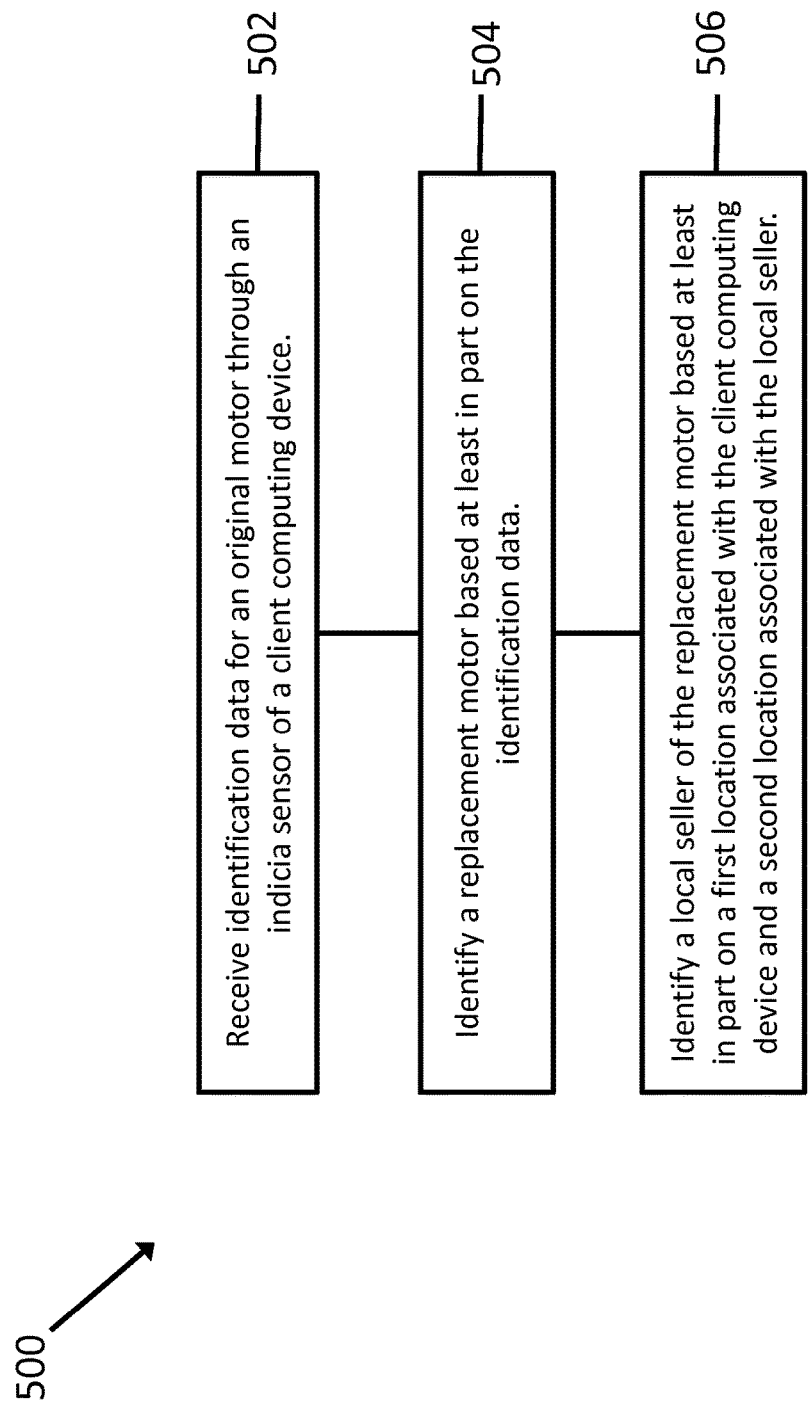
FIG. 5 is a flow chart of an example process that may be carried out by the client computing device of FIG. 1 for identifying a replacement motor.

FIG. 5 is a flow chart of an example process 500 that may be carried out by client computing device 102 for identifying a replacement motor. Initially, client computing device 102 receives 502 identification data for an original motor (e.g., motor 106) through an indicia sensor (e.g., indicia sensor 214). Additionally, client computing device 102 identifies 504 a replacement motor (e.g., first replacement motor 306 and/or second replacement motor 316) based at least in part on the identification data. Additionally, client computing device 102 identifies 506 a local seller (e.g., first seller 304 and/or second seller 314) of the replacement motor (e.g., first replacement motor 306 and/or second replacement motor 316) based at least in part on a first location 302 associated with client computing device 102 and a second location (e.g., second location 310 or third location 320) associated with the local seller (e.g., first seller 304 or second seller 314).

In some implementations, processor 205 (FIG. 2) of client computing device 102 is configured to obtain an image of indicia 104 on the original motor (e.g., motor 106) and perform optical character recognition on the obtained image. In some implementations, processor 205 is configured to receive identification data for the original motor (e.g., motor 106) through indicia sensor 214 by scanning a barcode associated with motor 106. In some implementations, for example where optical recognition is not performed or does not successfully obtain identification data from the obtained image, processor 205 is configured to transmit the obtained image to a computing device associated with the local seller (e.g., second seller computing device 318).

In some implementations, processor 205 is configured to determine first location 302 of client computing device 102 using GPS component 216. Also, in some implementations, processor 205 is configured to transmit an order for the replacement motor (e.g., second replacement motor 316) to a computing device (e.g., second seller computing device 318) associated with the local seller (e.g., second seller 314). Additionally, in some implementations, the original motor (e.g., motor 106) is associated with a first brand and processor 205 is configured to identify a replacement motor (e.g., second replacement motor 316) by identifying a replacement motor (e.g., second replacement motor 316) associated with a second brand that is different from the first brand. In some implementations, the identification data is first identification data, and processor 205 is configured to identify the replacement motor (e.g., second replacement motor 316) by querying a database (e.g., database 212) that correlates the first identification data for the original motor (e.g., motor 106) with second identification data for the replacement motor (e.g., second replacement motor 316).

In some implementations, processor 205 is configured to identify the local seller (e.g., second seller 314) of the replacement motor (e.g., second replacement motor 316) by at least querying a database (e.g., database 212) that correlates the replacement motor (e.g., second replacement motor 316) with at least one seller (e.g., second seller 314) and a respective location (e.g., third location 320) of the at least one seller. In some implementations, processor 205 is configured to display an option (e.g., option 406) to order the replacement motor (e.g., second replacement motor 316), receive a selection of the option to order the replacement motor, and transmit an order for the replacement motor to a computing device (e.g., second seller computing device 318) associated with the local seller (e.g., second seller 314).

Embodiments of the systems and methods described herein enable person to efficiently identify and order a replacement motor from a seller that is local to the person. Accordingly, consumers need not perform extensive research to identify a suitable replacement for a motor and to identify a seller of the replacement motor that is conveniently located near the consumer.

A technical effect of the methods and systems described herein may include one or more of: (a) receiving identification data for an original motor through an indicia sensor of a client computing device; (b) identifying a replacement motor based at least in part on the identification data; (c) identifying a local seller of the replacement motor based at least in part on a first location associated with the client computing device and a second location associated with the local seller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A client computing device comprising:
an indicia sensor configured to capture indicia data by obtaining an image of indicia disposed on an original electric motor and transmit an indicia data signal including the indicia data, the indicia data corresponding to the indicia disposed on or in the original electric motor and including the image, the original electric motor installed in one of a heating, ventilation, and air conditioning (HVAC) system and a pump system; and
a processor coupled to said indicia sensor, said processor configured to:
receive the indicia data signal transmitted from said indicia sensor;
determine an identification of the original electric motor by extracting the indicia data including the image from the received indicia data signal and perform optical character recognition on the image of the indicia to determine the identification of the original electric motor;
query a database to determine a first set of technical specifications corresponding to the original electric motor, the first set of technical specifications including at least one of torque data, power data, and speed data for the original electric motor;
compare the first set of technical specifications of the original electric motor to a second set of technical specifications stored in the database in association with at least a second electric motor, the second set of technical specifications including at least one of torque data, power data, and speed data for the second electric motor;
determine that the first set of technical specifications correspond with the second set of technical specifications when at least one of the torque data, power data, and speed data for the original electric motor are the same as the at least one of the torque data, power data, and speed data for the second electric motor;
identify the second electric motor as a replacement electric motor based at least in part on the identification data of the original electric motor and the determination that the first set of technical specifications correspond with the second set of technical specifications such that the replacement motor includes proper technical specifications for operation in one of the HVAC system or the pump system, wherein the original electric motor is associated with a first brand and said processor is further configured to identify a replacement motor associated with one of the first brand or a second brand that is different from the first brand; and
identify a local seller of the replacement electric motor based at least in part on a first location associated with said client computing device and a second location associated with the local seller; and
a display coupled to the processor and configured to display at least one of identification data of the replacement motor and the identified local seller of the replacement motor.

2. The client computing device of claim 1, wherein said processor is further configured to compare the first set of technical specifications with the second set of technical specifications by comparing a first torque to a second torque, a first power to a second power, and a first speed to a second speed.

3. The client computing device of claim 1, wherein said processor is configured to:
receive the image of indicia disposed on the original electric motor, the image captured by said indicia sensor; and
transmit the received image to a computing device associated with the local seller.

4. The client computing device of claim 1, wherein said client computing device further comprises a global positioning system (GPS) component and said processor is further configured to determine the first location of said client computing device using said GPS component.

5. The client computing device of claim 1, wherein said processor is further configured to transmit an order for the replacement motor to a computing device associated with the local seller.

6. The client computing device of claim 1, wherein said processor is further configured to recommend the local seller based in part on determining that the replacement motor is in stock at the local seller.

7. The client computing device of claim 1, wherein said processor is further configured to identify the local seller of the replacement motor by at least querying the database that correlates the replacement motor with at least one seller and a respective location of the at least one seller.

8. The client computing device of claim 1, wherein said processor is further configured to:
display an option to order the replacement motor;
receive a selection of the option to order the replacement motor; and
transmit an order for the replacement motor to a computing device associated with the local seller.

9. The client computing device of claim 1, wherein the indicia sensor comprises a camera of a mobile computing device, and the indicia is at least one of printed on the original electric motor itself, engraved on the original electric motor itself, a nameplate attached to the original electric motor, and a tag attached to the original electric motor.

10. A computer-implemented method for identifying a replacement electric motor, said method implemented by a client computing device that includes an indicia sensor and a processor, said method comprising:

capturing, by the indicia sensor, indicia data corresponding to indicia disposed on or in an original electric motor installed in one of a heating, ventilation, and air conditioning (HVAC) system and a pump system by obtaining an image of the indicia disposed on the original electric motor;

transmitting, by the indicia sensor, an indicia data signal that includes the indicia data and the image;

receiving, by the processor, the indicia data signal transmitted from said indicia sensor;

determining, by the processor, an identification of the original electric motor by extracting the received indicia data including the image and performing optical character recognition on the image of the indicia to determine the identification of the original electric motor;

querying, by the processor, a database to determine a first set of technical specifications corresponding to the original electric motor, the first set of technical specifications including at least one of torque data, power data, and speed data for the original electric motor;

comparing, by the processor, the first set of technical specifications of the original electric motor to a second set of technical specifications stored in the database in association with at least a second electric motor, the second set of technical specifications including at least one of torque data, power data, and speed data for the second electric motor;

determining, by the processor, that the first set of technical specifications correspond with the second set of technical specifications when at least one of the torque data, power data, and speed data for the original electric motor are the same as the at least one of the torque data, power data, and speed data for the second electric motor;

identifying, by the processor, the second electric motor as the replacement electric motor based at least in part on the identification data of the original electric motor and the determination that the first set of technical specifications correspond with the second set of technical specifications such that the replacement motor includes proper technical specifications for operation in one of the HVAC system or the pump system, wherein the original electric motor is associated with a first brand and the processor is further configured to identify a replacement motor associated with one of the first brand or a second brand that is different from the first brand;

identifying, by the processor, a local seller of the replacement electric motor based at least in part on a first location associated with the client computing device and a second location associated with the local seller; and displaying at least one of identification data of the replacement motor and the identified local seller of the replacement motor on a display device of the client computing device.

11. The computer-implemented method of claim 10, further comprising:

receiving the image of indicia disposed on the original electric motor, the image captured by said indicia sensor; and transmitting the received image to a computing device associated with the local seller.

12. The computer-implemented method of claim 10, wherein the client computing device further includes a global positioning system (GPS) component, said method further comprising determining the first location of the client computing device using the GPS component.

13. The computer-implemented method of claim 10, further comprising transmitting an order for the replacement motor to a computing device associated with the local seller.

14. The computer-implemented method of claim 10, wherein comparing the first set of technical specifications with the second set of technical specifications further comprises comparing at least one of a first torque to a second torque, a first power to a second power, and a first speed to a second speed.

15. The computer-implemented method of claim 10, further comprising:

displaying an option to order the replacement motor;

receiving a selection of the option to order the replacement motor; and transmitting an order for the replacement motor to a computing device associated with the local seller.

16. A non-transitory computer-readable storage medium having computer-executable instructions embodied thereon, wherein when executed by a client computing device having at least one processor coupled to an indicia sensor, the computer-executable instructions cause the client computing device to:

capture, by the indicia sensor, indicia data corresponding to indicia disposed on or in an original electric motor installed in one of a heating, ventilation, and air conditioning (HVAC) system and a pump system by obtaining an image of the indicia disposed on the original electric motor;

transmit, by the indicia sensor, an indicia data signal that includes the indicia data and the image;

receive the indicia data signal transmitted from said indicia sensor;

determine an identification of the original electric motor by extracting the received indicia data including the image and perform optical character recognition on the image of the indicia to determine the identification of the original electric motor;

query a database to determine a first set of technical specifications corresponding to the original electric motor, the first set of technical specifications including at least one of torque data, power data, and speed data for the original electric motor;

compare the first set of technical specifications of the original electric motor to a second set of technical specifications stored in the database in association with at least a second electric motor, the second set of technical specifications including at least one of torque data, power data, and speed data for the second electric motor;

determine that the first set of technical specifications correspond with the second set of technical specifications when at least one of the torque data, power data, and speed data for the original electric motor are the same as the at least one of the torque data, power data, and speed data for the second electric motor;

identify the second electric motor as a replacement electric motor based at least in part on the identification data of the original electric motor and the determination that the first set of technical specifications correspond with the second set of technical specifications such that the replacement motor includes proper technical specifications for operation in one of the HVAC system or the pump system, wherein the original electric motor is associated with a first brand and the client computing device is further configured to identify a replacement motor associated with one of the first brand or a second brand that is different from the first brand;

identify a local seller of the replacement electric motor based at least in part on a first location associated with the client computing device and a second location associated with the local seller; and display at least one of identification data of the replacement motor and the identified local seller of the replacement motor on a display device of the client computing device.

\* \* \* \* \*